(12) United States Patent
Atoji et al.

(10) Patent No.: US 8,196,111 B2
(45) Date of Patent: *Jun. 5, 2012

(54) BUCKETS OF COMMANDS IN A MULTIPROCESSOR-BASED VERIFICATION ENVIRONMENT

(75) Inventors: David M. Atoji, Apex, NC (US); Ruchi Chandra, Cary, NC (US); Robert B. Likovich, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1006 days.

This patent is subject to a terminal disclaimer.

(21) Appl. No.: 11/972,690

(22) Filed: Jan. 11, 2008

(65) Prior Publication Data

US 2008/0114965 A1    May 15, 2008

Related U.S. Application Data

(63) Continuation of application No. 10/620,472, filed on Jul. 16, 2003, now Pat. No. 7,398,515.

(51) Int. Cl.
*G06F 9/44* (2006.01)
(52) U.S. Cl. ............... 717/126; 717/124; 717/151
(58) Field of Classification Search ............... None
See application file for complete search history.

(56) References Cited

U.S. PATENT DOCUMENTS

| | | | |
|---|---|---|---|
| 4,984,239 A | 1/1991 | Suzuki et al. | 371/3 |
| 5,210,861 A | 5/1993 | Shimoda | 395/575 |
| 5,455,938 A | 10/1995 | Ahmed | 364/488 |
| 5,488,573 A | 1/1996 | Brown et al. | 364/578 |
| 5,572,666 A | 11/1996 | Whitman | 395/183.08 |
| 5,646,949 A | 7/1997 | Bruce, Jr. et al. | 37/127 |
| 5,745,767 A | 4/1998 | Rosen et al. | |
| 5,815,688 A | 9/1998 | Averill | 395/500 |
| 6,002,871 A | 12/1999 | Duggan et al. | |
| 6,871,298 B1 * | 3/2005 | Cavanaugh et al. | 714/33 |
| 6,950,963 B1 | 9/2005 | Parson et al. | |
| 7,926,035 B2 * | 4/2011 | Musuvathi et al. | 717/124 |

(Continued)

FOREIGN PATENT DOCUMENTS

JP  01180645  1/1988

(Continued)

OTHER PUBLICATIONS

Prabhat Mishra Nikil Dutt, Functional coverage driven test generation for validation of pipelined processors, 2005, IEEE.*

(Continued)

*Primary Examiner* — Lewis Bullock, Jr.
*Assistant Examiner* — Hau H Hoang
(74) *Attorney, Agent, or Firm* — Patrick J. Daugherty; Driggs, Hogg, Daugherty & Del Zoppo Co., LPA

(57) ABSTRACT

The present invention provides a method and system for providing a legal sequential combination of commands for verification testing of a computer system. Executable test commands are used to form sequentially ordered "buckets" of commands, wherein each bucket command sequence is legal under at least one rule. The buckets may be arranged in any sequential order, wherein a composite command sequence of the combined commands remains legal under the at least one rule. A further advantage of the invention is that wait/noop commands may be inserted within and between the buckets, extending the testing capabilities of the present invention into corner cases.

12 Claims, 3 Drawing Sheets

U.S. PATENT DOCUMENTS

| | | | |
|---|---|---|---|
| 7,966,521 B2 * | 6/2011 | Bussa et al. | 714/25 |
| 2004/0163059 A1 * | 8/2004 | Subbarayan | 716/5 |
| 2004/0230964 A1 | 11/2004 | Waugh et al. | |

FOREIGN PATENT DOCUMENTS

| | | |
|---|---|---|
| JP | 01180645 A1 | 7/1989 |
| JP | 8166892 A | 12/1994 |
| JP | 8166892A A1 | 6/1996 |
| JP | 10187475 A | 12/1996 |
| JP | 11230160 A | 1/1998 |
| JP | 11232131 A | 2/1998 |
| JP | 10187475 A1 | 7/1998 |
| JP | 11203160 A1 | 7/1999 |
| JP | 11232131 A1 | 8/1999 |
| JP | 2001051965 A | 8/1999 |
| JP | 2001051965 A1 | 2/2001 |

OTHER PUBLICATIONS

Becky Cavanaugh, Random test generation for multi-processor system, Aug. 2008, Obsidian Software Inc, p. 1-8.*

Patrice Godefroid Nils Klarlund, DART: Directed Automated Random Testing, Jun. 12-15, 2005, ACM 1-59593-080-9/050006.*

Mike G. Bartley, Darren Galpin, Tim Blackmore, "A Comparison of Three Verification Techniques: Directed Testing, Pseudo-Random Testing and Property Checking," dac, pp. 819, 39th Design Automation Conference (DAC'02), 2002.*

"A Biased Random Instruction Generation Environment for Architectural Verification of Pipelined Processors", Journal of Electronic Testing: Theory and Applications, pp. 13-27 (2000), Ta-Chung Chang.

"Micro Architecture Coverage Directed Generation of Test Programs", Design Automation Conference, Jun. 21-25, 1999, pp. 175-180.

"Verification by Behavorial Modeling —A Multiprocessor System Case, Conference on ASIC Proceedings", Oct. 21-24, 1996, pp. 43-45.

"Automatic Test Program Generation for Pipelined Processors", IEEE/ACM International Conference on CAD-94, Nov. 6-10, 1994, pp. 580-583.

* cited by examiner

Fig.2

```
library ieee;
  use ieee.std_logic_1164.all;
library sem_man_lib;
  use sem_man_lib.sem_rec_pkg.all;
package bucket_8a_p is
  constant cbucket_8a : bucket_T :=
    (size_of_bucket => 5,
     commands_array =>
       -- command 0, enable queue 0 and 1
       (0 => (operation => "000011", -- enable thread command
         order_id => "11",
         sem_num => "XX",
         sem_val => (others => 'X'),
         dir_flag => 'X',
         MSB_4addressbits => (others => 'X'),
         append => true,        -- valid only with enable command
         queue_number => "11"), -- valid only with enable command
                                -- should have the same value as order_id
       -- command 1, ordered lock, queue 0, sem 0, direct mode
       1 => (operation => "000000",
         order_id => "01",
         sem_num => "00",
         sem_val => "00001111000011110000111100001111",
         dir_flag => '1',
         MSB_4addressbits => "0001",
         append => false,       -- valid only with enable command
         queue_number => "01"), -- valid only with enable command
       -- command 2, reservation release, queue 1, direct
       2 => (operation => "000010",
         order_id => "10",
         sem_num => "01",  -- don't care for reservation release
         sem_val => "11110000111100001111000011110000",
         dir_flag => '1',
         MSB_4addressbits => "1111",
         append => false,       -- valid only with enable command
         queue_number => "01"), -- valid only with enable command
       -- command 3, unlock - sem 0, direct
       3 => (operation => "000001",
         order_id => "XX",
         sem_num => "01",
         sem_val => (others => 'X'),
         dir_flag => '1',
         MSB_4addressbits => "0001",
         append => false,       -- valid only with enable command
         queue_number => "01"), -- valid only with enable command
       -- command 4, enqueue
       4 => (operation => "000100",
         order_id => "XX",
         sem_num => "XX",
         sem_val => (others => 'X'),
         dir_flag => 'X',
         MSB_4addressbits => "0001",
         append => false,       -- valid only with enable command
         queue_number => "01"), -- valid only with enable command
       others => cCommand_others_x
      )
    );
end bucket_8a_p;
```

```
-- command 2, wait command - give some time for the other thread
-- to go pending on this thread
2 => (operation => cWAIT_AFTER_PREV_CPEI_CMD_DONE, --"001011"
    order_id => "XX",
    sem_num => "XX",
    sem_val => "1111000011110000111100001110000",
    dir_flag => '1',
    MSB_4addressbits => "1111",
    append => false,       -- valid only with enable command
    queue_number => "01"), -- valid only with enable command -- command 3, wait command
3 => (operation => "000101",
    order_id => "XX",
    sem_num => "XX",
    sem_val => "1111000011110000111100001110000",
    dir_flag => '1',
    MSB_4addressbits => "1111",
    append => false,       -- valid only with enable command
    queue_number => "01"), -- valid only with enable command
```

Fig.3

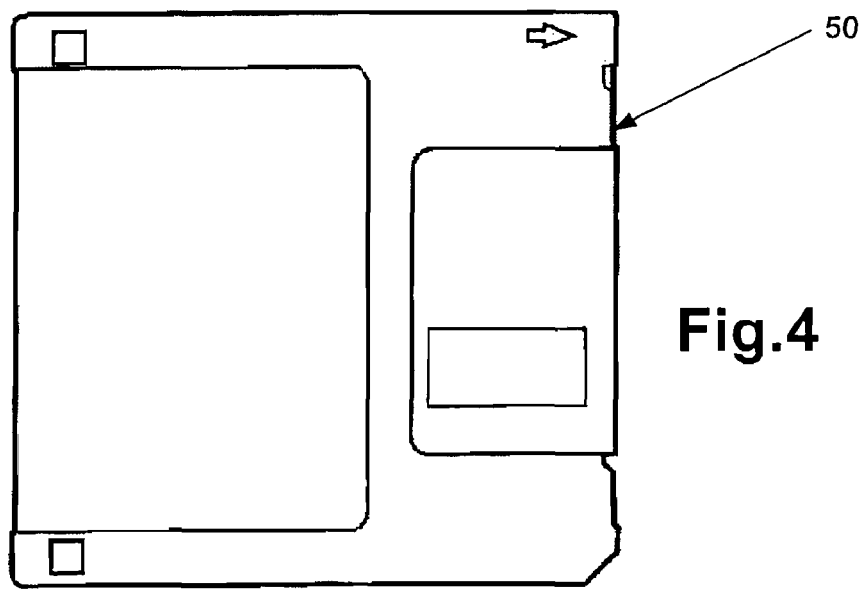

Fig.4

BUCKETS OF COMMANDS IN A MULTIPROCESSOR-BASED VERIFICATION ENVIRONMENT

CROSS-REFERENCE TO RELATED APPLICATIONS

The present application is a continuation of application Ser. No. 10/620,472, now U.S. Pat. No. 7,398,515, filed Jul. 16, 2003.

The present application is related to the following co-pending and commonly assigned United States patent applications, which are hereby incorporated by reference in their respective entirety: Ser. No. 10/179,860, now U.S. Pat. No. 7,454,753, filed on Jun. 25, 2002, for "Semaphore Management Subsystem for Use with Multi-Thread Processor Systems" by Davis et al; Ser. No. 10/179,100, filed on Jun. 25, 2002, for "Ordered Semaphore Management Subsystem" by Calvignac et al, now U.S. Pat. No. 7,089,555; Ser. No. 10/247,602, now U.S. Pat. No. 7,406,690, filed on Sep. 19, 2002, for "Flow Lookahead in an Ordered Semaphore Management Subsystem" by Jenkins et al; and Ser. No. 10/247,673, filed on Sep. 19, 2002, for "Method and Apparatus for Locking Multiple Semaphores" by Heddes et al, now U.S. Pat. No. 7,143,414.

FIELD OF THE INVENTION

A computer system comprising a multiprocessor environment with resources which can be accessed by all processors/threads.

BACKGROUND OF THE INVENTION

As is well known in the art, within a multiprocessor computer system, several command instructions are processed at the same time by a plurality of microprocessors, also known as coprocessors or processors. Each processor may simultaneously process multiple series of command instructions, or "threads," wherein each command instruction is processed by one processor thread. The routing of commands to the threads is controlled by a central manager. Each processor/thread operates independently from all the other processors/threads. Thus, as the software processes a command, the software has no knowledge of other instructions which have been, are being, or will be processed. Each processor executes the instructions in a sequential manner but independently and in parallel to the other processors. In order to ensure thorough testing of a multiprocessor computer system, many different techniques can be used.

Multiprocessor systems present a verification problem in the sense that there are countless scenarios that can be run. Traditionally, even in a self checking environment, scenarios are largely hard coded (i.e., all test input stimulus and sequences are pre-defined at run time), often referred to as "directed tests." Alternatively, scenarios may be fully randomized (i.e., test input stimulus and sequences are arbitrarily chosen at run time). The hard coded scenarios can be time consuming to write, and may still only cover a fraction of the actual function. In addition, as the number of processor/threads used in the simulation increases, the complexity of the desired test cases increases. Typically, a number of hard coded test cases are written to flush out the major functions, and then randomized test cases are written to cover the rest (including corner cases). The problem is that fully randomized test cases become quite complicated to manage in terms of ensuring complete test coverage. Additionally, a problem with fully randomized test cases is the possibility of selecting a sequence of commands that are invalid or of little testing value. Checking for these undesired sequences and correcting them increases the complexity of the test environment and severely restricts the random sequences that can be applied to the design under test.

SUMMARY OF THE INVENTION

The present invention provides a method and system for providing a legal sequential combination of commands for verification testing of a computer system. Executable test commands are used to form sequentially ordered "buckets" of commands, wherein each bucket command sequence is legal under at least one rule. The buckets may be arranged in any sequential order, wherein a composite command sequence of the combined commands remains legal under the at least one rule. A further advantage of the invention is that wait/noop commands may be inserted within and between the buckets, extending the testing capabilities of the present invention into corner cases.

BRIEF DESCRIPTION OF THE DRAWINGS

FIG. 2 is a text illustration of a software programming language embodiment of a bucket according to the present invention.

FIG. 3 is a text illustration of software programming language embodiments of wait/noop commands according to the present invention.

FIG. 4 is an article of manufacture comprising a computer usable medium having a computer readable program according to the present invention embodied in said medium.

DETAILED DESCRIPTION OF THE INVENTION

Figure 1:
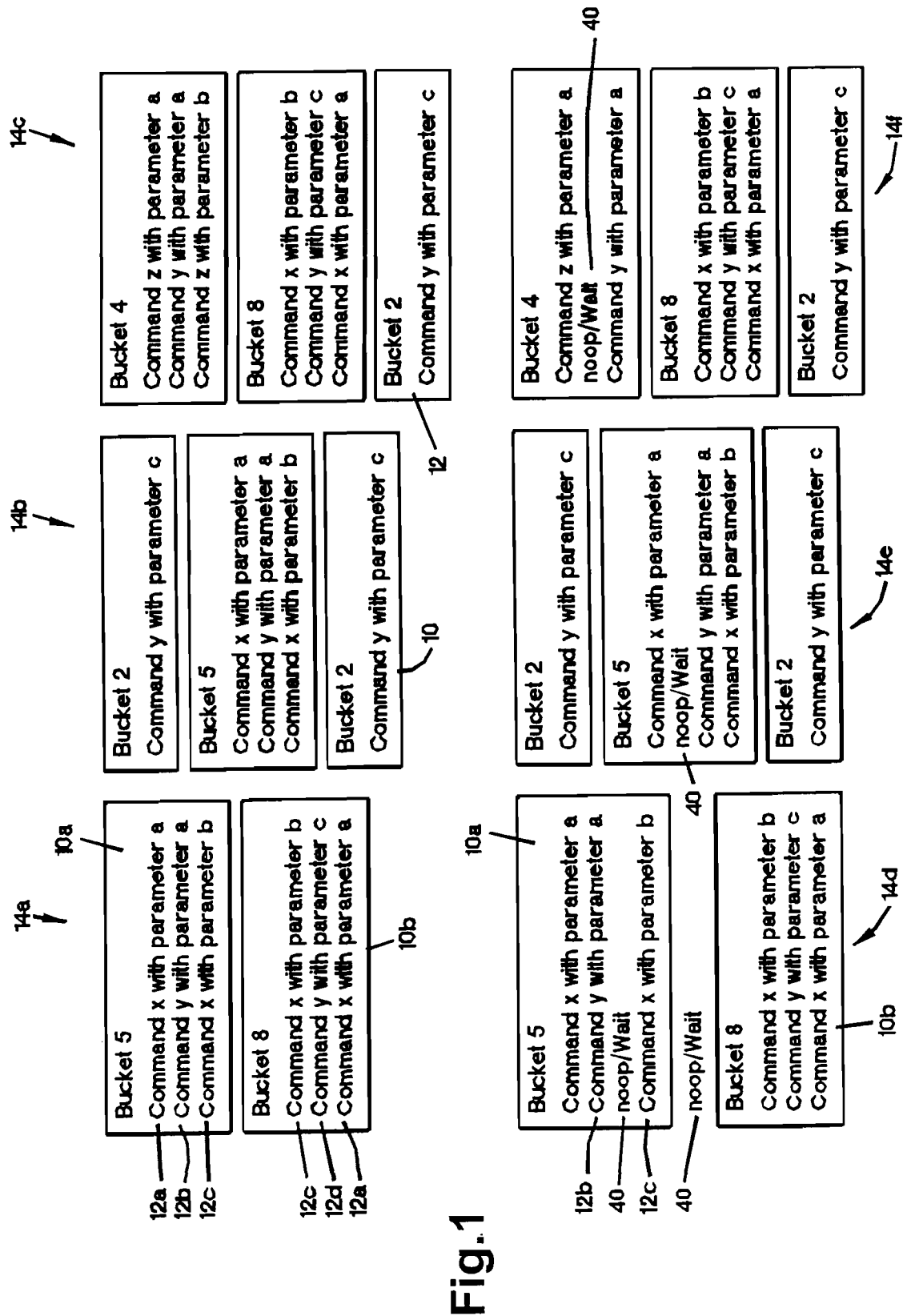
FIG. 1 is a block diagram representation of buckets and threads according to the present invention.

Where a multiprocessor system is comprised of a plurality of processors, and each processor comprises a plurality of threads, all of which are independent of each other in their operation, the typical computer central manager unit randomly dispatches commands to each thread. In this case, the central manager will randomly select processors, and the testing of the system will thereby also be random.

In order to test corner cases through the random generation and selection of threads through the central manager, large numbers of thread command series must be generated and routed through the central manager. However, in order to combine and run more than one command as a series of commands in a sequential fashion, "rules" must be observed or an undesired command sequence may produce test results with little or no value, or may even abort the test process. For example, in a prior art pure random generation system, the prior art generator may be asked to generate a sequence of ten commands. The generated ten-command sequence must now be examined for "illegal" combinations by a "filter." If the filter discovers an illegal combination, such as the fifth command rendered illegal by appearing after the third command, then the fifth command must be dropped and replaced, or the whole sequence discarded and regenerated.

In order to overcome these problems in the prior art random generation systems, a lot of man hours must be dedicated to decoding and deciphering the rules that apply to any given command or set of commands, and to then ensure that random command generation does not violate said rules by producing command combinations that will not return good results. A programmer must manually select each command in a command sequence by applying filter rules. Although this method will produce legal command sequences, it is directly limited by the imagination of the programmer, and by the time required to write each command sequence. Consequently, a limited number of designated threads may be efficiently written and tested in this manner.

The present invention is a powerful way to combine the benefits of hard coded scenarios and randomness. It enables the quick writing of test cases that span very easily from a simple single threaded test case all the way to a complex, all threads running stress test case. A mechanism is provided to attach a series of commands on either fixed or randomly selected processors. Code re-use is maximized while cutting and pasting of code is minimized.

The present invention provides for discrete groupings or "buckets" of preferred legal command sequences that may be combined and run together. Each bucket will run individually without violating any filter rule and, most importantly, a number of buckets may be strung together and run in a large compound series without violating the filter rules. True randomness may now be introduced in the selection of buckets, the order of buckets selected and strung together, and in the thread selected and tested by the central manager. Referring now to FIG. 1, a block diagram representation of buckets 10 according to the present invention is provided. Bucket 10$a$ is a sequential series of three arguments 12$a$, 12$b$ and 12$c$ wherein the sequential series may run on thread 14$a$ without violating any rule or generating any type of illegal response. Bucket 10$b$ is another sequential series block of three arguments 12$c$, 12$d$ and 12$a$ wherein the sequential series may also run on thread 14$a$ without violating any rule or generating any type of illegal response. Bucket 10$a$ may be manually or randomly combined with subsequent bucket 10$b$ to form a first composite sequential series of commands "12$a$-12$b$-12$c$-12$c$-12$d$-12$a$" wherein said series then may run on thread 14$a$ as a legal series of commands. Threads 14$b$ through 14$f$ illustrate other possible combinations of buckets 10 that may be run without violating any of the system or command rules.

What is new according to the present invention is that any of the buckets may be combined in any sequential sequence to produce other composite sequential series of commands that will run on one or more threads as a legal series of commands. Accordingly, bucket 10$b$ may be manually or randomly combined with subsequent bucket 10$a$ to form a second composite sequential series of commands "12$c$-12$d$-12$a$-12$a$-12$b$-12$c$" wherein said series then may also run on thread 14$a$ as a legal series of commands.

Each bucket may be manually composed by a programmer. The invention thus provides "hard coded randomness"; writing several simple hard coded command sequences, and then combining them in random ways, provides very powerful test coverage. It provides "controlled chaos" testing. Alternatively, buckets may be auto-generated and assembled through a set of filter rules.

As is common in the verification environment, it is preferred that commands are written to test one block of logic. In one embodiment of the present invention, a "semaphore manager" is provided within a larger multiprocessor system comprising a plurality of large logic blocks. A semaphore manager is a logic mechanism typically implemented into computer systems configured to run multiple shared common resources in parallel. Parallel processes may utilize shared common resources, such as devices, routines or memory locations. In order to prevent shared resource acquisition and use conflicts, and to prevent undesired intermittent read/write operations, a semaphore manager is utilized wherein the computer system grants sole access to a shared resource to a first process, with the semaphore manager handling a conflicting request from another parallel process. Typically, a semaphore manager is a software embodiment. The embodiment of the present invention illustrated herein is described with respect to a hardware semaphore manager and, in particular, to a semaphore manager described more fully in "Semaphore Management Subsystem for Use with Multi-Thread Processor Systems" by Davis et al, previously incorporated by reference. It will be readily apparent to one skilled in the art that the present invention may be adapted to be used with other software or hardware semaphore managers, or at a higher level of logic block interactions, such as at the "full chip level."

It is also to be understood that within the present invention the concept of a "legal" combination of commands refers to a sequence of commands that should produce predictable results. Illegal or undesirable command sequences would be those that result in a system hang or unpredictable result, even when a computer system design is implemented correctly. In addition to a "good machine" type of sequence, legal combinations would include error scenarios in which the logic should predictably recover. Examples of legal combinations in the present embodiment may include an unlock command before a lock command, and exiting with a semaphore still locked.

In the present embodiment ordered semaphore operations (ordered lock requests or reservation releases) must be done before the first enqueue and are not permitted after that. FIG. 2 illustrates a bucket 10$e$ of commands legal according to this rule. Bucket 10$e$ provides a sequence of five commands: an enable queue command 22, an ordered semaphore lock command 16, a semaphore release command 18, a semaphore unlock command 20 and an enqueue command 24. Descriptive comments 17 appear with "—" headings, as is conventional in programming languages.

The present commands can also have parameters, permitting variations enabling further threads to be tested. For example, the ordered semaphore lock command 16 has a lock parameter argument 36 wherein one bit is set, thus indicating that command 16 is an ordered command. Parameters can be manually or randomly selected, depending on the type of filter rules implemented. Comment line 30 describes the operation of ordered lock command 16 entitled "command 1" as a direct mode ordered lock command with queue 0 and semaphore 0. As described by comment line 17, the enable queue command 22 also functions as a verification environment statement that enables queue 0 and 1 in the semaphore manager, and an interface in the semaphore manager performs this enablement responsively. As described by comment line 30, argument 32 now functions as a lock request to the multiprocessor system. The operation code (or "opcode") parameter 34 indicates that this is a lock command by the "000000" value; and the order_id parameter 36 indicates that it is an ordered lock by its value of "01".

Although the multiprocessor system logic may see a number of commands (e.g. lock, unlock and reservation release) on a particular multiprocessor system bus, what the present invention provides to the verification environment is complete flexibility in that, whenever a verification command is needed, it is provided through use of the same parameters. All operation and verification model commands look the same to the multiprocessor system. In the present embodiment, the verification models use the opcode parameters to figure out the destination for each command.

FIG. 3 illustrates programming language embodiments of wait/noop commands 40 and 41 according to the present invention. The wait/noop commands 40 and 41 appear to the computer system in a fashion similar to the operations commands 16, 18, 20, 22, and 24 of FIG. 2. However, the opcode parameters 42 and 43 determine the destination of commands 40 and 41 as the verification model. It will be readily apparent that other commands may be used in this fashion, and the present invention is not limited to the commands described thus far.

Thus, the semaphore manager verification environment looks to the opcode parameter to determine the destination of the command. In all other respects, the verification model commands 40 and 41 look and are processed the same as the operations commands 16, 18, 20, 22, and 24. The opcode parameters 42 and 43 are interpreted by the semaphore manager verification environment as a "wait". Since commands 40 and 41 are wait commands, some of their fields no longer have operative significance. Thus, the order_id 44 and 45 values are set to "XX", since their value has no meaning where the system runs the commands 40 and 41 as "pauses" in the verification environment.

Therefore, from a testing standpoint, everything is very standardized and the commands have the same appearance. By using parameter arguments, specific queue, semaphore values and many other things can be targeted.

Another advantage of the present invention is that within each bucket the parameters of each instruction may be fixed or they may be randomized. For example, the semaphore block-command has a number of variations: semaphore number 1 can be unlocked, semaphore number 0 can be unlocked, or semaphore number 0 and number 1 can be unlocked. When a bucket is created according to the present invention, the semaphore number to be unlocked can be specified in the code "this bucket will only do unlocks of semaphore number zero." Alternatively, some type of code generator or script may be incorporated within the bucket to randomly select the semaphore number to be unlocked. Or a simple "unlock" command can be placed within a bucket, and as a model the processor will interpret the unlock command as a transaction across the bus, and the central manager may then randomly pick a semaphore to be unlocked by the command.

An additional advantage of the present invention is the substantial reduction in the need to "cut and paste" command series from one thread into other threads. As is well known in the art, if a series of instructions is found to be illegal and that faulty series has been copied from one thread into one or perhaps many more other threads, all of the threads incorporating the faulty series must be found and edited. These cutting and pasting mistakes can happen in hard coded scenarios since the number of files and test cases grows to an unmanageably large number. Moreover, it is possible that a fundamental change may affect all files. With the present invention, where a faulty command series occurs in a bucket, only that bucket must be edited. Any thread that incorporates that bucket will automatically be updated with a correction to that bucket. There is no need to examine each of a large series of manually created files, as is the case in the prior art verification systems.

In one embodiment of the present invention, a random test command generator may freely pick and string together any of the buckets provided to it. In contrast, prior art random generator systems require that every command available, and every possible combination of commands, must be examined through implemented combination rules to prevent illegal command combinations. Due to the larger effort required where there are a large number of commands, the prior art random command generation systems are very limited in the number and type of commands that are available for purely random test generation, or must incorporate very bulky filter rules.

Buckets of commands are very simple and straightforward to write. A bucket can contain N number of commands, configurable per test case. They have plenty of flexibility, but are most powerful when they are relatively simple in terms of what each individual bucket contains. More complex test cases can be written by simply stringing buckets together and spreading them across several threads. Moreover, pieces of real operational code may be utilized, possibly wringing out early software problems.

Employing the buckets, a simple test case can quickly be written that simply instantiates one bucket on one thread. Next, a more complex test case can be written very quickly that instantiates the same bucket on multiple threads. It is readily apparent that, if buckets with different functions are created, complex test cases are quickly created by simply stringing these different buckets together in varying order across all processors/threads. In addition, when debugging a problem, it is very easy to quickly write a test case that concentrates on a single thread/processor simply by not loading any buckets on other threads. This also allows faster debug and simulation.

Another advantage of the present invention is the use of the "wait/noop" command. Referring again to FIG. 1, threads 14*d*, 14*e* and 14*f* feature the buckets 10 and commands 12 of threads 14*a*, 14*b* and 14*c*, respectively, with wait/noop commands 40 inserted into and between the buckets 10. For example, thread 14*d* comprises bucket 10*a* with a wait/noop command 40 between command 12*b* and command 12*c*, and another wait/noop command 40 between bucket 10*a* and bucket 10*b*.

As is well known in the art, when a string of commands is queued up on a bus to be run by a multiprocessor processing system without a pacing algorithm, then regardless of the number of commands within each bucket, or the total number of commands of combined buckets, the commands will run in sequence one right after the other with no pausing between commands. Therefore, the same threads or thread combinations will typically run the commands in the same fashion every time. Accordingly, some command instruction combinations will be bypassed and not tested. This is problematic in that some multiprocessor system problems cannot be discovered until certain threads are run under certain conditions; for example, a batch of commands may not reveal a problem until run upon a designated first thread after a given number of cycles, and/or after a command is run on a designated second thread, and/or while another command is run simultaneously upon a third designated thread. This type of case is known in the art as a "corner case", an unobvious and unpredicted problem in the system which requires very specific and complex thread and command instruction interactions to occur, and is, therefore, not straightforward and hard to find.

For example, a system may work for all possible command combinations with wait delays between one to three cycles between the commands. However, the system may not work for situations wherein three commands are followed by a wait time of two cycles followed by two commands with a wait of four cycles followed by three commands when mixed with other threads doing similar things. Such a corner case is a complex multiprocessor thread interaction generated by a number of factors beyond routine programming and prediction.

What is new in the present invention is the use of wait/noop commands to extend the testing capabilities of the present invention into corner cases. Specific test case scenarios are easily created by using wait/noop commands to cause specific desired timing of commands and then combining several buckets to get a desired scenario.

The wait/noop command functions as a pacing device in the present invention. In a multiprocessor system, each thread functions as a separate requester, which filters down requests to a central manager within the system. For example, where a central manager receives thirty-two requests, a corner case problem or "bug" might not pop out during a test routine until thread one receives a request on the first cycle, thread two receives a request on the third cycle and thread three gets a request five cycles later. What is required is a way to create the corner case with the test commands. This would be accomplished under the present invention by sending a command immediately to thread one, inserting two wait/noop commands prior to sending a command to thread two, and running four wait/noop commands prior to sending a command to thread three.

The wait/noop command creates downtime within the system between commands. Downtime may be created with pauses randomly generated and inserted into the testing sequence by the testing system. However, the wait/noop command according to the present invention provides a means to specify exactly how many cycles of wait/downtime will be inserted at a given point during a testing sequence, allowing a programmer to manually manipulate the selection of threads and force the occurrence of a corner case. Another feature of the present invention is that both the randomly inserted pause and the manually created wait/noop command structure may be utilized together, thereby extending the manually programmed thread selection characteristics into a pure random testing pattern, without generating illegal commands.

Since the same timing patterns and wait/noop command patterns may generate the same system responses, it is desired that under the present invention subsequent testing patterns use buckets or combinations of buckets, wherein the wait/noop commands appear with a different frequency and location relative to the commands.

In one embodiment of the present invention, the use of wait/noop commands enables the different threads to be selected on successive iterations where the threads are selected in a "round robin" fashion. Where all the threads of a system are being simultaneously accessed, the system sees all threads ranked in the same hierarchy every iteration. Without variation in the sending of commands, the same threads will be selected during every iteration. Where all threads are equal in the round robin selection, then the same first ranked thread will always be chosen to receive the first test command, and the round robin system will increment to select the same next higher ranked thread for the second command in the iteration. By forcing a pause of one or more cycles with a wait/noop command between the first and second to test commands for the next test iteration, then the third ranked thread will be selected rather than the second ranked thread, causing different threads to be selected during the remainder of the test as compared to the first iteration, and thereby enabling the solving of additional unknown corner cases.

The present invention enables a programmer to quickly generate test cases of widely varying complexity. Simple test cases allow early debug of fundamental functions, while complex test cases stress all threads with randomized commands and parameters. Since buckets are targeted at specific simple scenarios (with the ability to string them together enhancing the complexity), individuals are able to contribute and write test cases without spending a lot of time coming up to speed on all aspects of the designs function. In fact, test cases can be created by someone with little to no knowledge of the design by simply putting the buckets together in different ways.

The present invention maximizes the benefits of randomization by allowing different commands to run on different threads at different times. Randomized wait/no-op insertion every time the test case is run will also increase code coverage by mixing up the order and time that commands are introduced to the design under test. Also, by manually using noop/wait statements, specific scenarios that require precise timing of commands are easily achieved, giving the ability to target specific areas of the design under test very easily and quickly by putting specific buckets on specific processors to hone in on a problem.

Moreover, if problems are found in other test environments (lab bringup, emulation, software simulation, customer problems, etc . . . ), this simulation methodology provides quick and precise target testing of a specific problem. Also, although the present invention has been discussed in a multiprocessor environment, it may also be utilized in single processor environments wherein only one thread or bus is being tested.

FIG. 4 is an illustration of a floppy disc 50. The disc 50 is an exemplary article of manufacture comprising a computer usable medium having a computer readable program according to the present invention as described above.

While preferred embodiments of the invention have been described herein, variations in the design may be made, and such variations may be apparent to those skilled in the art of computer architecture, systems and methods, as well as to those skilled in other arts. The present invention is by no means limited to the specific programming language and exemplary programming commands illustrated above, and other software and hardware implementations will be readily apparent to one skilled in the art. The scope of the invention, therefore, is only to be limited by the following claims.

What is claimed is:

1. A verification testing system for a multiprocessor computer system comprising multiple parallel processor threads, comprising:
   a semaphore manager connected to the microprocessor and configured to rout ordered semaphore command instructions to the microprocessor threads; and
   a memory device comprising a plurality of buckets of executable ordered semaphore test commands, each bucket comprising a plurality of the commands arranged in different sequentially ordered command sequences legal under at least one rule for forming legal ordered sequences of semaphore commands;
   the semaphore manager configured to combine buckets by randomly selecting the buckets and an order of the buckets within a sequential bucket test combination wherein an order of any of the buckets relative to another of the buckets may be changed and the sequential test combination remain legal under the at least one rule and thereby generate a predictable result when executed by the threads; and
   wherein the semaphore manager is configured to sequentially distribute at least one each of the composite test command sequence commands to a first plurality of the processor threads and observe the performance of each of the first plurality of threads.

2. The system of claim 1, wherein the executable ordered semaphore test commands are selected from the group comprising ordered arguments of the computer system real operational code, ordered specific test instructions targeted for verification purposes, and randomly generated ordered instructions.

3. The system of claim 2, wherein the sequential bucket test combination further comprises a wait command, and wherein the semaphore manager is configured to pause for at least one instruction cycle in response to the wait command and skip a next first plurality thread and distribute at least one next command ordered subsequent to the wait command to an alternative thread, the manager thereby sequentially distributing the test combination commands to each of a second plurality of the processor threads different from the first plurality; and observe the performance of each of the second plurality of threads in response to the distributed test commands.

4. The system of claim 3, wherein sequential bucket test combination further comprises said wait command within a bucket, between first and second buckets, before the first bucket, or after the second bucket.

5. The system of claim 4, wherein the executable test commands further comprise a parameter for at least one of the plurality of executable commands, and wherein the semaphore manager is configured to assign a value to the parameter and to identify and select a next thread for a next at least one command in response to the parameter value.

6. The system of claim 5 wherein the semaphore manager is configured to randomly select and unlock a semaphore in response to the parameter value.

7. An article of manufacture comprising a computer readable storage medium having a computer readable microprocessor semaphore manager program, wherein the semaphore manager program, when executed on a computer, causes the computer to:

form a plurality of buckets of ordered semaphore test commands each comprising a plurality of commands arranged in different sequentially ordered command sequences legal under at least one rule for forming a legal ordered sequence of semaphore test commands;

randomly select, order and combine a plurality of the buckets in a sequential bucket test combination having a test sequential order, the sequential bucket test combination having an ordered composite test command sequence, wherein an order of any of the buckets relative to another of the buckets within the test sequential order may be changed within the test sequential order, the test sequential order legal under the at least one rule, and thereby generate a predictable result when executed by the threads;

sequentially distribute at least one each of the composite test sequence commands to a first plurality of multiprocessor computer system parallel processor threads in a first thread distribution; and observe the performance of each of the first plurality of threads in response to the distributed test commands.

8. The article of manufacture of claim 7, wherein the ordered test commands are selected from the group comprising ordered semaphore arguments of computer system real operational code, specific ordered semaphore test instructions targeted for verification purposes, and randomly generated ordered semaphore instructions, and the composite test command sequence further includes a wait command, and wherein the semaphore manager program, when executed on a computer, causes the computer to:

pause for at least one instruction cycle and skip a next first plurality thread and distribute at least one next command ordered subsequent to the wait command to an alternative thread, the computer thereby sequentially distributing the test combination commands to each of a second plurality of the processor threads different from the first plurality; and observe the performance of each of the second plurality of threads in response to the distributed test commands.

9. The article of manufacture of claim 8, wherein the semaphore manager program, when executed on a computer, causes the computer to randomly insert the wait within a bucket, between first and second buckets, before the first bucket, or after the second bucket.

10. The article of manufacture of claim 9, wherein the semaphore manager program, when executed on a computer, causes the computer to insert a random amount of the wait command.

11. The article of manufacture of claim 10, wherein the semaphore manager program, when executed on a computer, causes the computer to assign a value to a parameter within at least one of the plurality of executable commands, and identify and select a next thread for a next at least one command in response to the parameter value.

12. The article of manufacture of claim 11, wherein the semaphore manager program, when executed on a computer, causes the computer to randomly select and unlock a semaphore in response to the parameter value.

* * * * *